2,953,601
METHOD OF PREPARING AMINES

Arthur C. Whitaker, Woodland Farms, Pa., assignor to Gulf Research & Development Company, Pittsburgh, Pa., a corporation of Delaware No Drawing. Filed May 28, 1956, Ser. No. 587,458

6 Claims. (Cl. 260—585)

This invention relates to a method of making amines, and more particularly to a method of making tertiary amines.

The reaction between alcohols and ammonia to form amines has been known for many years. One such reaction involves bringing the reactants together in vapor phase, with the ammonia in molar excess, at elevated temperatures to obtain primary amines. By operating in accordance with the present invention control of the reaction can easily be effected and a product predominating in tertiary amines can be obtained.

I have discovered that the reaction of ammonia with an alcohol can be controlled and a product predominating in tertiary amines (including tertiary hydroxy amines) can be obtained by a process which comprises bringing the reactants together in mixed phase, with the ammonia in vapor phase and the alcohol in liquid phase and in molar excess, in the presence of a hydrogenation-dehydrogenation catalyst at an elevated temperature while continuously removing water formed during the reaction from the reaction area. The amines produced are useful as intermediates for preparing quaternary ammonium salts which are used as bactericidal and fungicidal agents.

It is absolutely essential in carrying out the process of this invention to obtain a high conversion and a product predominating in tertiary amines that the water formed during the reaction between the alcohol and ammonia be continuously removed from the reaction zone. It is believed that the mechanism of the reaction in the presence of a hydrogenation-dehydrogenation catalyst involves the dehydrogenation of the alcohol to the aldehyde which in turn reacts with the ammonia, with water being one of the by-products of the reaction. By removing such water as formed from the reaction zone, the formation of tertiary amines is favored.

Obtaining a high conversion and a product predominating in tertiary amines is facilitated by carrying out the reaction with the reactants in mixed phase, that is, with the alcohol in liquid phase and the ammonia in vapor phase. If the reaction were carried out with each of the reactants in vapor phase, the temperature in many cases would be above the boiling point of the reactants and high enough to dehydrogenate the alcohol to the corresponding aldehyde. The aldehyde, in turn, would at the high temperatures be decarbonylated to the corresponding paraffin. By operating with the reactants in mixed phase, therefore, the temperature required for the operation would be correspondingly lower.

Also essential to the present process is the use of a hydrogenation-dehydrogenation catalyst for, as noted, it is believed the mechanism of the present invention involves the dehydrogenation of the alcohol to the corresponding aldehyde which then reacts with the ammonia. While any of the well-known hydrogenation-dehydrogenation catalysts are effective for catalyzing the present reaction between an alcohol and ammonia, particularly good results are obtained when the catalyst is Raney nickel, nickel on alumina, platinum, chromia on alumina, or molybdenum oxide on alumina. The concentration of the catalyst is not critical, however, and low concentrations will give good results. In general, at least about one, and preferably about 3 to about 10, parts by weight of effective catalyst per 100 parts by weight of alcohol gives good results.

Alcohols which can be aminated in accordance with the present invention include primary and secondary alcohols, particularly primary alcohols. As previously noted, the mechanism of the present reaction in the presence of a hydrogenation-dehydrogenation catalyst involves dehydrogenation of the alcohol to the aldehyde which then reacts with the ammonia. Tertiary alcohol therefore, would not be operative in the process of the present invention, since they cannot be dehydrogenated to form the corresponding carbonyl compound. Best results are obtained with alcohols, primary and secondary, having a total of at least about 5 carbon atoms in the molecule, preferably about 8 to about 13 carbon atoms in the molecule. Examples of alcohols which can be aminated in accordance with the process defined herein include n-octyl, isooctyl, n-decyl, isodecyl, tridecyl, isotridecyl, etc.

The present invention is preferably carried out at atmospheric pressure, although pressures up to about 100 pounds per square inch can be employed with good results. As noted previously, it is absolutely essential, in order to obtain high conversions and a product predominating in tertiary amines, to continuously remove water formed during the reaction from the reaction zone. When the reaction is carried out in accordance with the process of this invention, therefore, whether at atmospheric pressure or at elevated pressures, means, for example a vessel equipped with a condenser and a water trap, must be employed to continuously remove the water formed during the reaction from the reaction zone. I have found a particularly effective method for carrying out the reaction involves slowly bubbling ammonia through the alcohol under the reaction conditions defined herein while continuously condensing the water vapor formed during the reaction and removing the condensed water from the reaction zone. In such case, the ammonia should be bubbled through the alcohol at the rate of at least about 2 grams, preferably about 4 to about 8 grams, of ammonia per mole of alcohol per hour.

A particularly attractive feature of the present invention resides in the fact that the reaction can be carried out with good results at temperatures lower than those previously employed in corresponding reactions. As noted, operation with the reactants in mixed phase permits lower temperatures to be used. Thus temperatures as low as about 120° C. can be employed. The upper limit of the temperature which can be employed will be determined by the boiling point of the liquid phase reactants. In general, however, best results are obtained at a temperature of about 150° to about 250° C.

The time necessary to obtain reaction between the alcohol and ammonia is not critical, although a relatively long time is required to obtain large conversions. In general a reaction time of at least about 2 hours, preferably about 3 to about 6 hours, is sufficient to obtain large conversions.

Also very important in order to obtain a relatively large conversion in a continuous reaction to a product predominating in tertiary amines are the proportions of reactants employed. The ratio of alcohol to ammonia should be such that the alcohol is present in molar excess. In general at least about 1.1 mols of alcohol, preferably about 1.3 to about 3 mols of alcohol, per mol of ammonia produces excellent results.

The invention can further be illustrated by the following examples.

*Example 1*

A mixture containing 200 cc. (1.3 mols) of isooctyl alcohol, 58 grams (3.4 mols) of ammonia, each in vapor phase, and 13.3 liters (0.53 mol) of hydrogen, to suppress side reactions, was passed over 100 grams of 2½ percent by weight nickel on alumina at atmospheric pressure and a temperature of 225° C. at a space velocity of 2.0 (parts by weight of total reactants per part by weight of catalyst per hour). The product recovered amounted to 153 grams. Of this 5.6 grams consisted of light hydrocarbons and aldehyde, 128.6 grams unreacted isooctyl alcohol, 2.8 grams were lost in distillation and 16.5 grams of a mixture of dioctyl and trioctyl amines. The amines were each present in a ratio of about 50 weight percent. The conversion was therefore about 24 percent, while the yield of amines was about 10 percent. It is believed that the low conversions and yields are due to the fact that after the alcohol was dehydrogenated, decarbonylation of the resulting aldehyde takes place as well as some cracking. Also, a large part of the alcohol remains unreacted. This example clearly shows that vapor phase reaction with ammonia in molar excess does not produce the amine product desired herein.

*Example 2*

Into a bomb was placed a mixture containing 200 grams of isooctyl alcohol, 10 grams of Raney nickel and 4 grams of liquid anhydrous ammonia. The mixture was heated at a temperature varying from 180° to 185° C. for a period of 3½ hours, while the pressure at the beginning of the reaction was 60 to 70 pounds per square inch. Water formed during the reaction was not permitted to escape, for the bomb was sealed at the beginning of the reaction. About 24 percent by weight of the alcohol was converted during the reaction. Of this 16 percent by weight was dioctyl amine, while 55 percent by weight was a mixture of trioctyl amine and dioctylhydroxyoctyl amine. It can be seen from this example that although the alcohol was present in molar excess, water formed during the reaction was confined and not permitted to escape. Accordingly the yield of tertiary amines was small.

*Example 3*

The above examples should be contrasted with the present example and Example 4 which were conducted in accordance with the present invention. About 20 grams of ammonia were bubbled through 200 grams of isooctyl alcohol containing 10 grams of Raney nickel at a reaction temperature of about 165° to 190° C. over a period of about 3½ hours. The water vapor formed during the reaction was condensed and removed from the reaction zone. The conversion of the alcohol was substantially complete, and about 170 grams of product were recovered. About 20 percent by weight of such product was dioctyl amine, while about 65 percent by weight was trioctyl amine and dioctylhydroxyoctyl amine.

*Example 4*

345 grams of isotridecyl alcohol and 8.5 grams of Raney nickel were refluxed at a temperature of 240° C. while 20 grams of ammonia were bubbled therethrough over a period of 5 hours. 30 grams of water were evolved and removed from the reaction zone, and 296 grams of product was recovered. 142 grams of the recovered product was tri(tridecyl amine) and 51 grams of unreacted alcohol remained. The conversion was therefore 82 percent, and the yield of tertiary amine was 58 percent.

These examples illustrate the fact that high conversions and a product predominating in tertiary amines can easily be obtained in accordance with the present process.

Obviously many modifications and variations of the invention, as hereinbefore set forth, can be made without departing from the spirit and scope thereof, and therefore only such limitations should be imposed as are indicated in the appended claims.

I claim:

1. In a method of making amines from alcohols selected from the group consisting of primary and secondary alcohols having at least 5 carbon atoms in the molecule but no more than 13 carbon atoms in the molecule and ammonia in the presence of a hydrogenation-dehydrogenation catalyst, the improvement which comprises bringing the reactants together in mixed phase, with the ammonia in vapor phase and the alcohol in liquid phase, at least about 1.1 mols of alcohol being present per mol of ammonia, at a pressure of about atmospheric to about 100 pounds per square inch and a temperature of at least about 120° C. but no more than about 250° C. while continuously removing water formed during the reaction from the reaction zone.

2. In a method of making amines from alcohols selected from the group consisting of primary and secondary alcohols having at least 5 carbon atoms in the molecule but no more than 13 carbon atoms in the molecule and ammonia in the presence of a hydrogenation-dehydrogenation catalyst, the improvement which comprises bringing the reactants together in mixed phase, with the ammonia in vapor phase and the alcohol in liquid phase, at least about 1.1 mols of alcohol being present per mol of ammonia, at a pressure of about atmospheric to about 100 pounds per square inch and a temperature of at least about 120° C. but no more than about 250° C. for at least about 2 hours while continuously removing water formed during the reaction from the reaction zone.

3. In a method of making amines from alcohols selected from the group consisting of primary and secondary alcohols having at least 5 carbon atoms in the molecule but no more than 13 carbon atoms in the molecule and ammonia in the presence of a hydrogenation-dehydrogenation catalyst, the improvement which comprises bubbling ammonia through the alcohol in liquid phase, with the alcohol being present in molar excess, at a pressure of about atmospheric to about 100 pounds per square inch and an elevated temperature of about 120° to about 250° C. while continuously removing water formed during the reaction from the reaction zone.

4. In a method of making amines from isooctyl alcohol and ammonia in the presence of a hydrogenation-dehydrogenation catalyst, the improvement which comprises bringing the reactants together in mixed phase, with the ammonia in vapor phase and the alcohol in liquid phase, at least about 1.1 mols of alcohol being present per mol of ammonia, at a pressure of about atmospheric to about 100 pounds per square inch and a temperature of at least about 120° C. but no more than about 250° C. while continuously removing water formed during the reaction from the reaction zone.

5. In a method of making amines from isooctyl alcohol and ammonia in the presence of a hydrogenation-dehydrogenation catalyst, the improvement which comprises bringing the reactants together in mixed phase, with the ammonia in vapor phase and the alcohol in liquid phase, at least about 1.1 mols of alcohol being present per mol of ammonia, at a pressure of about atmospheric to about 100 pounds per square inch and a temperature of at least about 120° C. but no more than about 250° C. for at least about 2 hours while continuously removing water formed during the reaction from the reaction zone.

6. In a method of making amines from isooctyl alcohol and ammonia in the present of a hydrogenation-dehydrogenation catalyst, the improvement which comprises bubbling ammonia through the alcohol in liquid phase, with the alcohol being present in molar excess, at a pressure of about atmospheric to about 100 pounds per square inch and an elevated temperature of about 120° to about 250° C. while continuously removing water formed during the reaction from the reaction zone.

References Cited in the file of this patent

UNITED STATES PATENTS

| | | |
|---|---|---|
| 1,799,722 | Arnold | Apr. 7, 1931 |
| 2,519,560 | Fowler | Aug. 22, 1950 |
| 2,754,330 | Schreyer | July 10, 1956 |

OTHER REFERENCES

Stevenson: Industrial and Engineering Chem., vol. 41, No. 9 (1949), pp. 1849, 1850.